(12) United States Patent
Xiong (10) Patent No.: US 11,321,013 B2
(45) Date of Patent: May 3, 2022

(54) DISK ACCESS METHOD AND HOST

(71) Applicant: Huawei Technologies Co., Ltd., Shenzhen (CN)

(72) Inventor: Xiaoyong Xiong, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/440,386

(22) Filed: Jun. 13, 2019

(65) Prior Publication Data

US 2019/0294379 A1 Sep. 26, 2019

Related U.S. Application Data

(63) Continuation of application No. PCT/CN2017/115633, filed on Dec. 12, 2017.

(30) Foreign Application Priority Data

Dec. 14, 2016 (CN) .......................... 201611152193.8

(51) Int. Cl.
*G06F 3/06* (2006.01)
*G06F 12/10* (2016.01)
*G06F 13/16* (2006.01)
*G06F 13/40* (2006.01)

(52) U.S. Cl.
CPC .............. *G06F 3/0659* (2013.01); *G06F 3/06* (2013.01); *G06F 3/0604* (2013.01); *G06F 3/0674* (2013.01); *G06F 12/10* (2013.01); *G06F 13/1668* (2013.01); *G06F 13/4022* (2013.01); *G06F 2212/657* (2013.01)

(58) Field of Classification Search
CPC ........ G06F 3/0659; G06F 3/06; G06F 3/0604; G06F 3/0674; G06F 12/10; G06F 13/1668; G06F 13/4022; G06F 2212/657; G06F 3/067; G06F 3/0665; G06F 3/0635; G06F 3/0611; G06F 3/0658; G06F 3/0676
See application file for complete search history.

(56) References Cited

U.S. PATENT DOCUMENTS

| | | | |
|---|---|---|---|
| 7,571,289 B2 * | 8/2009 | Gotoh | ................... G06F 3/0617 |
| | | | 711/114 |
| 8,838,850 B2 | 9/2014 | Dommeti et al. | |
| 8,862,832 B1 | 10/2014 | Cartmell et al. | |
| 2007/0233700 A1 | 10/2007 | Tomonaga | |

(Continued)

FOREIGN PATENT DOCUMENTS

| | | |
|---|---|---|
| CN | 101067779 A | 11/2007 |
| CN | 101201723 A | 6/2008 |

(Continued)

*Primary Examiner* — Masud K Khan
(74) *Attorney, Agent, or Firm* — Slater Matsil, LLP (57) ABSTRACT

A disk access method is provided. The method includes: generating an input/output IO request, where the IO request carries a logical unit number LUN and a virtual address of to-be-accessed data; finding, based on the LUN, an LU to be accessed, and determining, based on the virtual address, a virtual address space into which the virtual address falls; determining, based on the determined virtual address space, an access path corresponding to the virtual address space (S230); and delivering, along the access path, the IO request to a controller pointed by the access path.

14 Claims, 4 Drawing Sheets

(56) References Cited

U.S. PATENT DOCUMENTS

| | | |
|---|---|---|
| 2007/0233997 A1 | 10/2007 | Kobara |
| 2010/0125857 A1 | 5/2010 | Dommeti et al. |
| 2010/0153612 A1 | 6/2010 | Zwisler et al. |
| 2012/0265935 A1 | 10/2012 | Luo |
| 2013/0250947 A1* | 9/2013 | Zheng .................... H04L 45/02 370/389 |
| 2013/0282935 A1* | 10/2013 | Miyamoto ............. G06F 3/067 710/38 |
| 2014/0075143 A1* | 3/2014 | Matsuya ................ G06F 12/02 711/170 |
| 2014/0164698 A1* | 6/2014 | Satoyama ............... G06F 3/061 711/114 |
| 2015/0248254 A1* | 9/2015 | Matsunaga ............ G06F 3/061 711/5 |
| 2015/0301955 A1* | 10/2015 | Yakovenko ............ G06F 21/79 711/163 |
| 2016/0070490 A1 | 3/2016 | Koarashi et al. |
| 2018/0039424 A1 | 2/2018 | Cui et al. |

FOREIGN PATENT DOCUMENTS

| | | |
|---|---|---|
| CN | 101539842 A | 9/2009 |
| CN | 101751228 A | 6/2010 |
| CN | 101751233 A | 6/2010 |
| CN | 102375695 A | 3/2012 |
| CN | 103838515 A | 6/2014 |
| CN | 104571960 A | 4/2015 |
| CN | 105022587 A | 11/2015 |
| CN | 106155577 A | 11/2016 |

\* cited by examiner

DISK ACCESS METHOD AND HOST

CROSS-REFERENCE TO RELATED APPLICATIONS

This application is a continuation of International Application No. PCT/CN2017/115633, filed on Dec. 12, 2017, which claims priority to Chinese Patent Application No. 201611152193.8, filed on Dec. 14, 2016. The disclosures of the aforementioned applications are hereby incorporated by reference herein in their entireties.

TECHNICAL FIELD

This application relates to the storage field, and more specifically, to a disk access method and a host.

BACKGROUND

Usually, a storage array can be divided into a plurality of Logical Unit (LU), and the LUs obtained after the division may be mounted to a host, to provide a data storage service for the host. Usually, the LU may also be referred to as a logical unit number Logical Unit Number (LUN). Usually, the storage array includes a plurality of controllers, and each LUN is corresponding to a controller to which the LUN belongs. To be specific, an LUN belonging to a controller can be accessed only by the controller to which the LUN belongs. There may be a plurality of access paths from the host to the LUN, and the host may run multipath software to select an access path to access the LUN. When a controller that is of a storage device and to which the selected access path points receives an input/output (I/O) request message sent by the host, the IO request is forwarded to the controller to which the LUN belongs if the controller receiving the IO request is not a controller to which an LUN to be accessed by using the IO request belongs, and the controller to which the LUN belongs processes the IO request.

In addition, each disk in the storage array is also corresponding to a controller to which the disk belongs. A disk belonging to a controller can be accessed by only the controller to which the disk belongs. If a disk in which a storage space corresponding to a logical space of the LUN to be accessed by using the IO request is located does not belong to the controller receiving the IO request, the IO request is forwarded to a controller to which the disk in which the storage space is located belongs. An increase in a quantity of IO request forwarding times necessarily causes an increase in an I/O access delay.

SUMMARY

Embodiments of this application provide a disk access method and a host, to reduce a delay caused by IO request forwarding.

According to a first aspect, a disk access method is provided, where the method is applied to a host, the host is connected to a storage device, at least one logical unit LU is mounted to the host, each LU includes at least one virtual address space, each virtual address space is corresponding to an access path, a controller that is of the storage device and to which the access path points can directly access data corresponding to each virtual address space, and the method includes: generating an input/output IO request, where the IO request carries a logical unit number LUN and a virtual address of to-be-accessed data; finding, based on the LUN, an LU to be accessed by using the IO request, and determining, based on the virtual address, a virtual address space into which the virtual address falls; determining, based on the determined virtual address space, an access path corresponding to the virtual address space; and delivering, along the access path, the IO request to a controller to which the access path points, so that the controller accesses, based on the LUN and the virtual address in the IO request, a disk belonging to the controller, to obtain the data requested by using the IO request.

In this way, the host may determine, based on the LUN and the virtual address that are included in the IO request, the virtual address space into which the virtual address falls, and then determine the corresponding access path based on the virtual address space, to deliver, along the access path, the IO request to the controller to which the access path points. Because the controller can directly access the data corresponding to the virtual address, IO request forwarding is avoided.

It should be understood that in the host, each virtual address space is corresponding to an access path, in other words, there is a correspondence between each virtual address space and an access path. The correspondence is generated by the host, and the correspondence may be stored in the host in a form of a table, a tree, or the like.

In some possible implementations, the method further includes: obtaining a controller corresponding to each virtual address space included in each LU, where a disk that stores the data corresponding to each virtual address space belongs to the controller corresponding to each virtual address space; determining an access path that points to the controller corresponding to each virtual address space; and establishing a correspondence between the virtual address space included in each LU and the determined access path that points to the controller corresponding to each virtual address space.

In these implementations, if the host needs to determine the access path corresponding to each virtual address space, the host first needs to obtain the controller corresponding to each virtual address space included in each LU, and then determines the access path that points to the controller corresponding to each virtual address space, to establish the correspondence between the virtual address space included in each LU and the determined access path that points to the controller corresponding to each virtual address space.

In some possible implementations, the determining an access path that points to the controller corresponding to each virtual address space includes: determining at least two access paths that point to the controller corresponding to each virtual address space; and determining, based on loads of the at least two access paths, the access path that points to the controller corresponding to each virtual address space.

In these implementations, the host may determine, based on the loads of the access paths, the access path that points to the controller corresponding to each virtual address space, so that load balancing between the access paths can be implemented.

In some possible implementations, the obtaining a controller corresponding to each virtual address space included in each LU includes: sending a request message to a primary controller, where the request message is used to request to obtain the controller corresponding to each virtual address space included in each LU, and the primary controller is configured to generate the controller corresponding to each virtual address space; and receiving the controller that is sent by the primary controller and that is corresponding to each virtual address space included in each LU.

In these implementations, the primary controller may be any controller in a storage system, and the primary controller is configured to generate the controller corresponding to each virtual address space. The host may send the request message to the primary controller, to obtain the controller corresponding to each virtual address space.

Optionally, the obtaining a controller corresponding to each virtual address space included in each LU includes: receiving the controller that is corresponding to each virtual address space included in each LU and that is sent by a storage management device connecting the storage device and the host.

In these implementations, the storage management device may be a third-party management system independent of the host and the storage system. The storage management device connects the host and the storage device. The storage management device may send, to the host, the controller corresponding to each virtual address space included in each LU.

According to a second aspect, a disk access method is provided, where the method is applied to a host, the host is connected to a storage device, at least one logical unit LU is mounted to the host, each LU includes at least one virtual address space, each virtual address space is corresponding to a controller, the controller can directly access data corresponding to each virtual address space, and the method includes: generating an input/output IO request, where the IO request carries a logical unit number LUN and a virtual address of to-be-accessed data; finding, based on the LUN, an LU to be accessed by using the IO request, and determining, based on the virtual address, a virtual address space into which the virtual address falls; determining, based on the determined virtual address space, a controller corresponding to the virtual address space; determining an access path pointing to the controller as an access path of the IO request, where the controller that is of the storage device and to which the access path points can directly access the data corresponding to each virtual address space; and delivering, along the access path, the IO request to the controller to which the access path points, so that the controller accesses, based on the LUN and the virtual address in the IO request, a disk belonging to the controller, to obtain the data requested by using the IO request.

Therefore, the host may determine, by using the LUN and the virtual address of the to-be-accessed data that are included in the IO request, the virtual address space into which the virtual address falls, to determine the controller corresponding to the virtual address space. Then, the host determines the access path pointing to the controller as the access path of the IO request, and delivers, along the access path, the IO request to the controller to which the access path points. Because the controller can directly access the data corresponding to the virtual address, IO request forwarding is avoided.

It should be understood that in the host, each virtual address space is corresponding to the controller, in other words, there is a correspondence between each virtual address space and the controller. The correspondence is generated by the host, and the correspondence may be stored in the host in a form of a table, a tree, or the like.

In some possible implementations, the determining an access path pointing to the controller as an access path of the IO request includes: determining at least two access paths that point to the controller; and determining the access path of the IO request based on loads of the at least two access paths.

If there are at least two access paths that point to the controller, the host may determine the access path of the IO request based on the loads of the at least two access paths, so that load balancing between the access paths can be implemented.

In some possible implementations, the method further includes: obtaining a controller corresponding to each virtual address space included in each LU, where a disk that stores the data corresponding to each virtual address space belongs to the controller corresponding to each virtual address space.

In some possible implementations, the obtaining a controller corresponding to each virtual address space included in each LU includes: sending a request message to a primary controller, where the request message is used to request to obtain the controller corresponding to each virtual address space included in each LU, and the primary controller is configured to generate the controller corresponding to each virtual address space; and receiving the controller that is sent by the primary controller and that is corresponding to each virtual address space included in each LU.

In these implementations, the primary controller may be any controller in a storage system, and the primary controller is configured to generate the controller corresponding to each virtual address space. The host may send the request message to the primary controller, to obtain the controller corresponding to each virtual address space.

In some possible implementations, the obtaining a controller corresponding to each virtual address space included in each LU includes: receiving the controller that is corresponding to each virtual address space included in each LU and that is sent by a storage management device connecting the storage device and the host.

In these implementations, the storage management device may be a third-party management system independent of the host and the storage system. The storage management device connects the host and the storage device. The storage management device may send, to the host, the controller corresponding to each virtual address space included in each LU.

According to a third aspect, a disk access method is provided, where the method is applied to a controller in a storage system, the storage system includes a storage device, the storage device is divided into at least one logical unit LU, each LU includes at least one virtual address space, and the method includes: generating a controller corresponding to each virtual address space included in each LU; and sending, to a host, the controller corresponding to each virtual address space included in each LU.

The method may be performed by a primary controller. The primary controller may be any controller in the storage system. The primary controller is configured to generate the controller corresponding to each virtual address space. The primary controller sends, to the host, the controller corresponding to each virtual address space, so that the host can establish a correspondence between a virtual address space and a controller or a correspondence between a virtual address space and an access path based on the controller corresponding to each virtual address space.

Optionally, the method further includes: synchronizing, to each controller in the storage system, the controller corresponding to each virtual address space included in each LU, so that a controller receiving an IO request accesses, based on a logical unit number LUN and a virtual address of to-be-accessed data that are in the IO request, a disk belonging to the controller, to obtain the data requested by using the IO request.

In this way, the primary controller synchronizes, to each controller, the controller corresponding to each virtual address space included in each LU, so that when receiving an IO request sent by the host, the controller can determine, based on the controller corresponding to each virtual address space included in each LU, whether the controller can directly process the IO request.

Optionally, the method further includes: determining that the controller that is in the storage system and that is corresponding to the virtual address space changes; generating a changed controller corresponding to each virtual address space; and sending, to the host, the changed controller corresponding to each virtual address space.

When data distribution in the storage system changes, in other words, when the controller corresponding to each virtual address space changes, the changed controller corresponding to each virtual address space is generated, and the changed controller corresponding to each virtual address space is sent to the host.

According to a fourth aspect, a host is provided, where the host is connected to a storage device, at least one logical unit LU is mounted to the host, each LU includes at least one virtual address space, each virtual address space is corresponding to a controller, the controller can directly access data corresponding to each virtual address space, and the host includes:

a processing unit, configured to: generate an input/output IO request, where the IO request carries a logical unit number LUN and a virtual address of to-be-accessed data; find, based on the LUN, an LU to be accessed by using the IO request; determine, based on the virtual address, a virtual address space into which the virtual address falls; determine, based on the determined virtual address space, a controller corresponding to the virtual address space; and determine an access path pointing to the controller as an access path of the IO request, where the controller that is of the storage device and to which the access path points can directly access the data corresponding to each virtual address space; and a sending unit, configured to deliver, along the access path, the IO request to the controller to which the access path points, so that the controller accesses, based on the LUN and the virtual address in the IO request, a disk belonging to the controller, to obtain data requested by using the IO request.

In a possible implementation, the processing unit is further configured to:

obtain a controller corresponding to each virtual address space included in each LU, where a disk that stores the data corresponding to each virtual address space belongs to the controller corresponding to each virtual address space.

In a possible implementation, the sending unit is further configured to:

send a request message to a primary controller, where the request message is used to request to obtain the controller corresponding to each virtual address space included in each LU, and the primary controller is configured to generate the controller corresponding to each virtual address space; and the host further includes:

a receiving unit, configured to receive the controller that is sent by the primary controller and that is corresponding to each virtual address space included in each LU.

In a possible implementation, a receiving unit is further configured to:

receive the controller that is corresponding to each virtual address space included in each LU and that is sent by a storage management device connecting the storage device and the host.

According to a fifth aspect, a host is provided, configured to perform the method in any one of the first aspect, or the possible implementations of the first aspect. Specifically, the host may include a unit configured to perform the method in any one of the first aspect, or the possible implementations of the first aspect.

According to a sixth aspect, a host is provided, configured to perform the method in any one of the second aspect, or the possible implementations of the second aspect. Specifically, the host may include a unit configured to perform the method in any one of the second aspect, or the possible implementations of the second aspect.

According to a seventh aspect, a controller is provided, configured to perform the method in any one of the third aspect, or the possible implementations of the third aspect. Specifically, the controller may include a unit configured to perform the method in any one of the third aspect, or the possible implementations of the third aspect.

According to an eighth aspect, a host is provided, including a memory and a processor. The memory is configured to store an instruction, and the processor is configured to execute the instruction stored in the memory. In addition, execution of the instruction stored in the memory enables the processor to perform the method in any one of the first aspect, or the possible implementations of the first aspect.

According to a ninth aspect, a host is provided, including a memory and a processor. The memory is configured to store an instruction, and the processor is configured to execute the instruction stored in the memory. In addition, execution of the instruction stored in the memory enables the processor to perform the method in any one of the second aspect, or the possible implementations of the second aspect.

According to a tenth aspect, a controller is provided, including a memory and a processor. The memory is configured to store an instruction, and the processor is configured to execute the instruction stored in the memory. In addition, execution of the instruction stored in the memory enables the processor to perform the method in any one of the third aspect, or the possible implementations of the third aspect.

According to an eleventh aspect, a computer readable storage medium is provided, configured to store a computer program. The computer program includes an instruction used to perform the method in any one of the first aspect, or the possible implementations of the first aspect, the method in any one of the second aspect, or the possible implementations of the second aspect, and the method in any one of the third aspect, or the possible implementations of the third aspect.

Based on the foregoing technical solutions, in the disk access method according to the embodiments of this application, the host is connected to the storage device, the at least one LU is mounted to the host, each LU includes the at least one virtual address space, and each virtual address space is corresponding to the access path. The host may generate the IO request, and the IO request includes the LUN and the virtual address of the to-be-accessed data. The host may determine the access path based on the LUN and the virtual address, and deliver, along the access path, the IO request to the controller to which the access path points. Because the controller can directly access the data corresponding to the virtual address, a delay caused by IO request forwarding can be avoided.

DETAILED DESCRIPTION OF ILLUSTRATIVE EMBODIMENTS

The following describes technical solutions of the embodiments of this application with reference to accompanying drawings.

Figure 1:
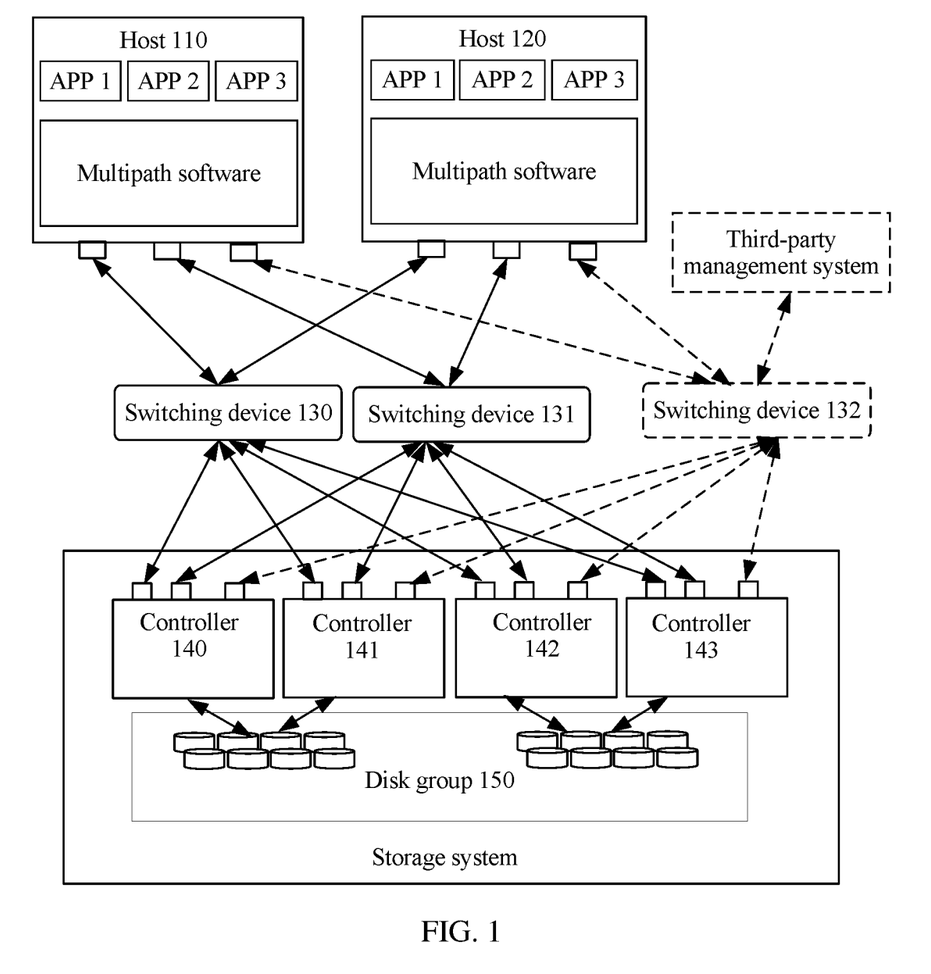
FIG. 1 is a schematic architectural diagram of a system applicable to an embodiment of this application.

FIG. 1 is a schematic architectural diagram of a system applicable to an embodiment of this application. It should be understood that FIG. 1 is only a schematic description diagram for ease of understanding, and does not limit a composition mode of the system. As shown in FIG. 1, the system 100 may include a host 110.

The host 110 may also be referred to as a server 110, and various application programs are installed on the host 110, for example, an APP 1, an APP 2, or an APP 3 shown in FIG. 1. The host runs an application program to generate an application program-based IO request, to access an LUN mounted to the host. The host 110 runs multipath software to select a delivery path of the IO request. In this embodiment of this application, to reduce a quantity of IO forwarding times, a controller that is of a storage device and to which the selected delivery path points may directly access a disk in which data corresponding to a virtual address carried in the IO request is located. In other words, the disk in which the data corresponding to the virtual address is located belongs to the controller to which the delivery path points. For example, the IO request is used to request to access a first virtual address, and data corresponding to the first virtual address is stored in a first disk. Because only a controller to which the first disk belongs can access the first disk, the multipath software may directly deliver the IO request to the controller to which the first disk belongs, so that the controller to which the first disk belongs can directly access the first disk to obtain data requested by using the IO request, and the IO request does not need to be forwarded, thereby reducing a delay caused by IO request forwarding.

Optionally, the system 100 may include only one host such as the host 110 shown in FIG. 1, or may include a plurality of hosts such as the host 110 and a host 120 shown in FIG. 1.

The system 100 may further include a switching device 130, and the switching device 130 may be a storage area network (SAN) switch. The host 110 may communicate with a controller in a storage system by using the switching device 130.

Optionally, the system 100 may further include more switching devices such as a switching device 131 shown in FIG. 1.

Optionally, the system may further include a switching device 132, and the switching device 132 may be an Ethernet switch. The host 110 may further communicate with a controller in the storage system by using the switching device 132, and the host 110 may also communicate with a third-party management system by using the switching device 132.

A controller 140 to a controller 143 are constituent parts of the storage system, and may receive an IO request delivered by the host 110. The IO request may include an LUN and a virtual address of to-be-accessed data. The controller 140 to the controller 143 may determine, based on the LUN and the virtual address, a disk to be accessed by using the IO request. If a controller to which the disk belongs is the controller 140 receiving the IO request, the controller 140 may directly access the disk to obtain the data requested by using the IO request. If a controller to which the disk belongs is not the controller 140 receiving the IO request, the controller 140 forwards the IO request to the controller to which the disk belongs.

In addition, at least one access path has been established between the host 110 and the controller 140 to the controller 143, and a solid line arrow shown in FIG. 1 is an access path between the host and the controller. The IO request of the host 110 may be sent to the controller along the at least one access path.

To further reduce IO request forwarding, in this embodiment, each controller may access any LUN. In other words, each LUN is an active-active LUN (AA LUN) that belongs to no controller.

A disk group 150 is a constituent part of the storage system, and includes a plurality of disks. Each disk belongs to a controller, and only the controller to which the disk belongs can access the disk.

Figure 2:
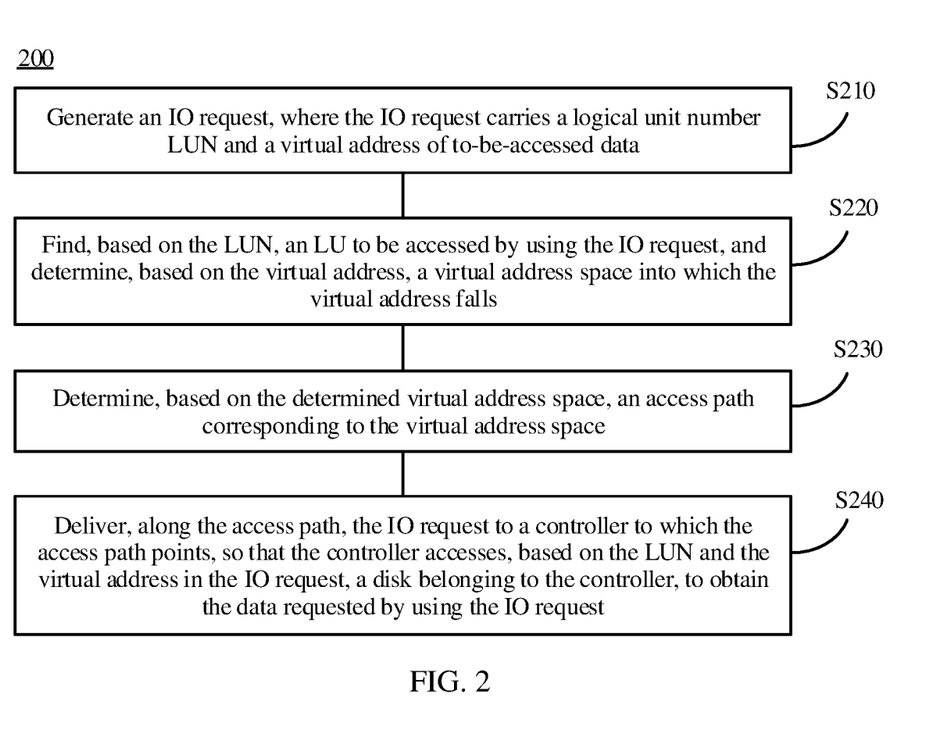
FIG. 2 is a schematic flowchart of a disk access method according to a first embodiment of this application.
Figure 3:
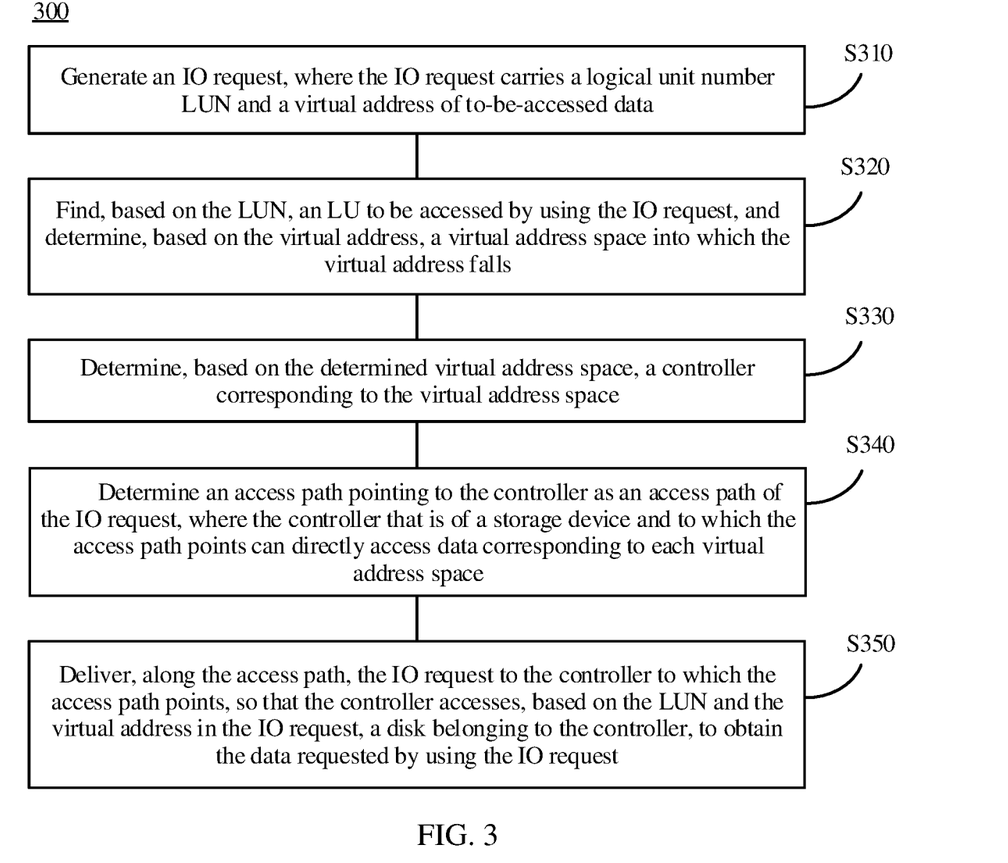
FIG. 3 is a schematic flowchart of a disk access method according to a second embodiment of this application.

The following describes in detail a disk access method according to an embodiment of this application with reference to FIG. 2 and FIG. 3.

It should be understood that FIG. 2 and FIG. 3 are schematic flowcharts of a disk access method according to an embodiment of this application, and show detailed communication steps or operations of the method. However, these steps or operations are merely examples. Other operations or variations of various operations in FIG. 2 and FIG. 3 may be further performed in this embodiment of this application. In addition, all the steps in FIG. 2 and FIG. 3 may be separately performed in a sequence different from that presented in FIG. 2 and FIG. 3, and it is possible that not all the operations in FIG. 2 and FIG. 3 need to be performed.

FIG. 2 is a schematic flowchart of a disk access method 200 according to a first embodiment of this application.

The first embodiment is based on the following premise: A host has established a connection to a controller in a storage system, at least one LU is mounted to the host, each LU includes at least one virtual address space, each virtual address space is corresponding to at least one access path, and a controller to which each access path corresponding to each virtual address space points can directly access data corresponding to each virtual address space.

In other words, in the host, each virtual address space is corresponding to an access path, in other words, there is a correspondence between each virtual address space and an access path. The correspondence is generated by the host, and the correspondence may be stored in the host in a form of a table, a tree, or the like.

Specifically, a correspondence between each virtual address space included in each LU in the host and an access path that points to a controller corresponding to each virtual address space may be generated as follows: When an LU is created, a primary controller in the storage system may divide each LU into at least one virtual address space, and the primary controller may allocate a corresponding disk space to each virtual address space included in each LU. It is equivalent that a correspondence between each virtual address space and a corresponding disk space is established, and accessing to the virtual address space is actually accessing to the corresponding disk space. In addition, only a controller to which each disk belongs can access the disk to obtain data in the disk. Therefore, to ensure that data corresponding to virtual address spaces to be accessed by using an IO request is stored in disks belonging to one controller, disk spaces allocated to the virtual address spaces belong to one controller. In this way, the primary controller may establish a correspondence between a virtual address space in each LU and a controller that can obtain data corresponding to the virtual address space. After the correspondence between a virtual address space in each LU and a corresponding controller is established, the established correspondence may be sent to the host based on a sending request of the host, or the established correspondence is sent to a storage management device, so that the storage management device sends the established correspondence to the host. In this way, the host may establish, based on a controller corresponding to each virtual address space included in each LU, the correspondence between each virtual address space included in each LU and an access path that points to a controller corresponding to each virtual address space. The following describes a specific process in which the host establishes the correspondence between each virtual address space included in each LU and an access path that points to a controller corresponding to each virtual address space. After establishing the correspondence between each virtual address space included in each LU and an access path that points to a controller corresponding to each virtual address space, the host stores the correspondence in the host. When the host needs to deliver an IO request, the host may obtain an access path of the IO request only by querying the correspondence.

With reference to FIG. 2, the following describes in detail how the host accesses a disk based on the correspondence between each virtual address space included in each LU and an access path that points to a controller corresponding to each virtual address space. As shown in FIG. 2, the method 200 includes the following steps.

S210. Generate an input/output IO request, where the IO request carries a logical unit number LUN and a virtual address of to-be-accessed data.

Specifically, the IO request may be generated by the host by running an application program, and the IO request includes the LUN and the virtual address of the to-be-accessed data. The virtual address may be a logical block address (LBA), or may be an address indicated in another addressing manner. The virtual address may be indicated by a start address and an address length, may be indicated by a start address and an end address, or the like. This is not limited in this embodiment of this application.

S220. Find, based on the LUN, an LUN to be accessed by using the IO request, and determine, based on the virtual address, a virtual address space into which the virtual address falls.

S230. Determine, based on the determined virtual address space, an access path corresponding to the virtual address space.

Specifically, the host may find, based on the LUN included in the IO request, the LU to be accessed by using the IO request, and then find, based on the virtual address of the to-be-accessed data, the virtual address space into which the virtual address falls. Because each virtual address space is corresponding to an access path in the host, the access path corresponding to the virtual address space may be determined based on the determined virtual address space.

S240. Deliver, along the access path, the IO request to a controller to which the access path points.

S250. The controller to which the access path points accesses, based on the LUN and the virtual address in the IO request, a disk belonging to the controller, to obtain the data requested by using the IO request.

Specifically, after determining the access path of the IO request, the host may deliver, along the access path, the IO request to the controller to which the access path points, so that the controller can access the disk belonging to the controller, to obtain the data requested by using the IO request.

The following describes in detail how the host establishes the correspondence between each virtual address space included in each LU and an access path that points to a controller corresponding to each virtual address space.

Specifically, if the host needs to establish the correspondence between a virtual address space included in each LU and a determined access path that points to a controller corresponding to each virtual address space, the host first needs to obtain the controller corresponding to each virtual address space included in each LU, namely, a correspondence between each virtual address space and a controller corresponding to each virtual address space. A process of obtaining the controller corresponding to each virtual address space included in each LU is described above, and is not described herein again. After obtaining the controller corresponding to each virtual address space included in each LU, the host determines the access path that points to the controller corresponding to each virtual address space, in other words, determines which access paths point to the controller corresponding to each virtual address space. There may be one or at least two access paths that point to a controller corresponding to a virtual address space. If there is only one access path that points to a controller corresponding to a virtual address space, the host may determine that the access path is an access path that points to the controller corresponding to the virtual address space. Alternatively, if there are at least two access paths that point to a controller corresponding to a virtual address space, the host may determine one access path from the at least two access paths to serve as an access path that points to the controller corresponding to the virtual address space.

Optionally, when there are at least two access paths that point to the controller corresponding to each virtual address space, the determining the access path that points to the controller corresponding to each virtual address space may include: determining the at least two access paths that point to the controller corresponding to each virtual address space; and determining, based on loads of the at least two access paths, the access path that points to the controller corresponding to each virtual address space.

Specifically, if there are at least two access paths that point to a controller corresponding to a virtual address space, the host may determine, based on loads of the at least two access paths, an access path that points to the controller corresponding to the virtual address space. For example, the host may select an access path with a lower load from the at least two access paths to serve as the access path that points to the controller corresponding to the virtual address space, and deliver, along the access path, the IO request to the controller corresponding to the virtual address space. Because the controller can directly access the disk in which the data corresponding to the virtual address carried in the IO request is located, in other words, the disk in which the data corresponding to the virtual address is located belongs to a controller to which the delivery path points, a delay caused by IO request forwarding is avoided.

Optionally, the host may randomly select one of the at least two access paths as the access path that points to the controller corresponding to the virtual address space, or the host may select an access path with a shorter delay from the at least two access paths to serve as the access path that points to the controller corresponding to the virtual address space.

Optionally, the controller corresponding to each virtual address space included in each LU, namely, the correspondence between each virtual address space included in each LU and a controller may be represented in a manner shown in Table 1.

TABLE 1

| LUN | Virtual address space | Controller ID |
|---|---|---|
| VOL 1 | [ADDR 1, ADDR 2] | CTL 1 |
| VOL 1 | [ADDR 2, ADDR 3] | CTL 2 |
| VOL 1 | [ADDR 3, ADDR 4] | CTL 3 |
| VOL 2 | [ADDR 1, ADDR 2] | CTL 1 |
| VOL 3 | [ADDR 2, ADDR 3] | CTL 1 |

It can be learned from Table 1 that the storage system includes three LUs: An LU whose LUN is VOL 1 is denoted as an LU 1, an LU whose LUN is VOL 2 is denoted as an LU 2, and an LU whose LUN is VOL 3 is denoted as an LU 3. The LU 2 and the LU 3 each include one virtual address space, and the virtual address space is corresponding to a controller whose identifier is CTL 1 and that is denoted as a controller 1. The LU 1 includes three virtual address ranges that are respectively corresponding to different controllers. A virtual address space [ADDR 1, ADDR 2] is corresponding to the controller 1. A virtual address space [ADDR 2, ADDR 3] is corresponding to a controller whose identifier is CTL 2 and that is denoted as a controller 2. A virtual address space [ADDR 3, ADDR 4] is corresponding to a controller whose identifier is CTL 3 and that is denoted as a controller 3.

If the correspondence between each virtual address space and a controller is as shown in Table 1, the correspondence that is generated based on the foregoing correspondence and that is between a virtual address space included in each LU and a determined access path that points to a controller corresponding to each virtual address space may be represented in a manner shown in Table 2.

TABLE 2

| LUN | Virtual address space | PATH ID |
|---|---|---|
| VOL 1 | [ADDR 1, ADDR 2] | PATH 1 |
| VOL 1 | [ADDR 2, ADDR 3] | PATH 4 |
| VOL 1 | [ADDR 3, ADDR 4] | PATH 5 |
| VOL 2 | [ADDR 1, ADDR 2] | PATH 2 |
| VOL 3 | [ADDR 1, ADDR 2] | PATH 3 |

It can be learned from Table 2 that an access path that points to the controller (namely, the controller 1) corresponding to the virtual address space [ADDR 1, ADDR 2] included in the LU 1 is a path 1, an access path that points to the controller (namely, the controller 2) corresponding to the virtual address space [ADDR 2, ADDR 3] included in the LU 1 is a path 4, an access path that points to the controller (namely, the controller 3) corresponding to the virtual address space [ADDR 3, ADDR 4] included in the LU 1 is a path 5, an access path that points to the controller (namely, the controller 1) corresponding to the virtual address space [ADDR 1, ADDR 2] included in the LU 2 is a path 2, and an access path that points to the controller (namely, the controller 1) corresponding to the virtual address space [ADDR 1, ADDR 2] included in the LU 3 is a path 3. For example, if the LUN included in the IO request is VOL 1, and the virtual address is [ADDR 1, ADDR 2], the host may determine, based on Table 2, that the LU that the IO request requests to access is the LU 1. If the virtual address falls into a first virtual address space in the LU 1, the host may determine that an access path corresponding to the virtual address space is the path 1, so that the host can deliver the IO request to the controller 1 along the path 1.

The following describes a manner in which the host obtains the controller corresponding to each virtual address space included in each LU.

Manner 1:

The obtaining the controller corresponding to each virtual address space included in each LU may include:

sending a request message to a primary controller, where the request message is used to request to obtain the controller corresponding to each virtual address space included in each LU; and receiving the controller that is sent by the primary controller and that is corresponding to each virtual address space included in each LU.

In other words, the primary controller may send, to the host based on the request message of the host, the controller corresponding to each virtual address space included in each LU.

Optionally, if the system actually includes a plurality of hosts, the primary controller may send, to each of the plurality of hosts, the controller corresponding to each virtual address space, so that each host determines a delivery path of the IO request based on the controller corresponding to each virtual address space.

Manner 2:

The obtaining the controller corresponding to each virtual address space included in each LU may include:

receiving the controller that is corresponding to each virtual address space included in each LU and that is sent by a storage management device connecting a storage device and the host.

In other words, the storage management device may first obtain, from a primary controller, the controller corresponding to each virtual address space, and then send, to the host, the controller corresponding to each virtual address space. The storage management device may be a third-party management system independent of the host and the storage system, for example, the third-party management system shown in FIG. 1.

Optionally, after generating the controller corresponding to each virtual address space included in each LU, the primary controller may further synchronize, to each controller in the storage system, the controller corresponding to each virtual address space included in each LU.

Specifically, the primary controller may synchronize, to each controller in a distributed lock manner, the controller corresponding to each virtual address space included in each LU. To be specific, when the primary controller synchronizes a controller that is on a first controller and that is corresponding to each virtual address space included in each LU, the primary controller locks the controller that is on the first controller and that is corresponding to each virtual address space included in each LU. In this case, another controller can only read the controller that is on the first controller and that is corresponding to each virtual address space included in each LU, but cannot write the controller that is on the first controller and that is corresponding to each virtual address space included in each LU, so that the controller corresponding to each virtual address space included in each LU is prevented from being written by a plurality of controllers at the same time.

It should be understood that the actions performed by the host or the primary controller in this embodiment of this application may be implemented by a processor by executing an instruction stored in a memory. Specifically, the actions performed by the host in the method 200 may be performed by multipath software in the host, may be performed by other software having a management control function in the host, may be performed by a combination of software and hardware, or the like. This is not limited in this embodiment of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The disk access method according to the first embodiment of this application is described above in detail with reference to FIG. 2. When a correspondence stored in the host is the correspondence between each virtual address space included in each LU and a controller corresponding to each virtual address space, an embodiment of this application provides another disk access method below. The following describes in detail a disk access method according to a second embodiment of this application with reference to FIG. 3.

FIG. 3 is a schematic flowchart of a disk access method 300 according to a second embodiment of this application. The method 300 may be applied to the system 100 shown in FIG. 1. In the second embodiment, a correspondence between a virtual address space in each LU and a controller accessing data in the virtual address space also needs to be established. A correspondence establishment method is the same as the method described in the first embodiment, and details are not described herein again. A main difference between the second embodiment and the first embodiment is as follows: In the first embodiment, after obtaining a correspondence between a virtual address space in each LU and a controller accessing data in the virtual address space, a host further determines an access path corresponding to the virtual address space in each LU; and after receiving an IO request, the host obtains an access path of the IO request based on the access path corresponding to the virtual address space in each LU. However, in the second embodiment, after obtaining a correspondence between a virtual address space in each LU and a controller accessing data in the virtual address space, a host does not perform further processing; after receiving an IO request, the host determines, based on the correspondence between a virtual address space in each LU and a controller accessing data in the virtual address space, an LU and a virtual address of to-be-accessed data that are included in the IO request, to determine a corresponding controller; and determines an access path pointing to the controller as an access path of the IO request, to deliver the IO request to the controller along the access path pointing to the controller.

With reference to FIG. 3, the following describes in detail how the host accesses a disk based on the correspondence between each virtual address space included in each LU and a controller corresponding to each virtual address space. As shown in FIG. 3, the method 300 includes the following steps.

S310. Generate an input/output IO request, where the IO request carries a logical unit number LUN and a virtual address of to-be-accessed data.

S320. Find, based on the LUN, an LU to be accessed by using the IO request, and determine, based on the virtual address, a virtual address space into which the virtual address falls.

Specifically, specific processes of S310 and S320 are similar to specific processes of S210 and S220 in the method 200. For brevity, details are not described herein again.

S330. Determine, based on the determined virtual address space, a controller corresponding to the virtual address space.

S340. Determine an access path pointing to the controller as an access path of the IO request, where the controller that is of the storage device and to which the access path points can directly access data corresponding to each virtual address space.

S350. Deliver, along the access path, the IO request to the controller to which the access path points, so that the controller accesses, based on the LUN and the virtual address in the IO request, a disk belonging to the controller, to obtain the data requested by using the IO request.

Specifically, a correspondence stored in the host is the correspondence between each virtual address space included in each LU and a controller corresponding to each virtual address space. The host may find, based on the LUN included in the IO request, the LU to be accessed by using the IO request, and then find, based on the virtual address that is of the to-be-accessed data and that is in the IO request, the virtual address space into which the virtual address falls, to determine the controller corresponding to the virtual address space. Then, one of access paths pointing to the controller is determined as the access path of the IO request. Optionally, if there is one access path that points to the controller, the access path may be determined as the access path of the IO request. Alternatively, if there are at least two access paths that point to the controller, one of the at least two access paths may be determined as the access path of the IO request.

In the second embodiment, a method in which the host determines the access path of the IO request from the at least two access paths that point to the controller corresponding to the virtual address space is similar to the method described in the first embodiment. For brevity, details are not described herein again.

In the second embodiment, a method in which the host obtains the controller corresponding to each virtual address space included in each LU is similar to the method described in the first embodiment. For brevity, details are not described herein again.

Therefore, in the disk access method in this embodiment of this application, the host is connected to a storage device, at least one LU is mounted to the host, each LU includes at least one virtual address space, and each virtual address space is corresponding to a controller. The host may generate the IO request, and the IO request includes the LUN and the virtual address of the to-be-accessed data. The host may determine the corresponding controller based on the LUN and the virtual address, and deliver, along the access path that points to the controller, the IO request to the controller to which the access path points. Because the controller can directly access the data corresponding to the virtual address, a delay caused by IO request forwarding can be avoided.

It should be understood that the actions performed by the host or a primary controller in this embodiment of this application may be implemented by a processor by executing an instruction stored in a memory. Specifically, the actions performed by the host in the method 300 may be performed by multipath software in the host, may be performed by other software having a management control function in the host, may be performed by a combination of software and hardware, or the like. This is not limited in this embodiment of this application.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The disk access method according to the embodiments of this application is described above in detail with reference to FIG. 2 and FIG. 3. The following describes in detail a host according to an embodiment of this application with reference to FIG. 4 and FIG. 5.

Figure 4:
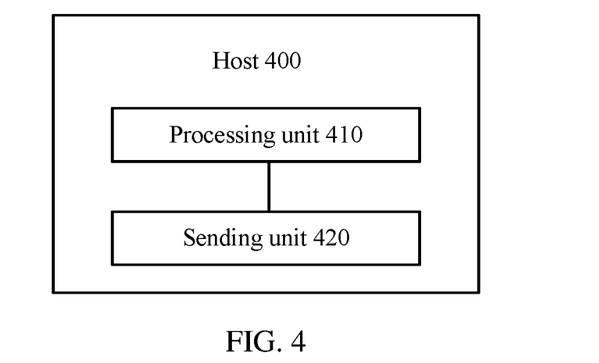
FIG. 4 is a schematic block diagram of a host according to an embodiment of this application.

FIG. 4 is a schematic block diagram of a host 400 according to an embodiment of this application. As shown in FIG. 4, the host 400 includes a processing unit 410 and a sending unit 420.

Optionally, in a first embodiment, the host 400 has established a connection to a controller in a storage system, at least one LU is mounted to the host 400, each LU includes at least one virtual address space, each virtual address space is corresponding to at least one access path, and a controller to which each access path corresponding to each virtual address space points can directly access data corresponding to each virtual address space.

Specifically, when an LU is created, a primary controller in the storage system may divide each LU into at least one virtual address space, and the primary controller may allocate a corresponding disk space to each virtual address space included in each LU. It is equivalent that a correspondence between each virtual address space and a corresponding disk space is established, and accessing to the virtual address space is actually accessing to the corresponding disk space. In addition, only a controller to which each disk belongs can access the disk to obtain data in the disk. Therefore, to ensure that data corresponding to virtual address spaces to be accessed by using an IO request is stored in disks belonging to one controller, disk spaces allocated to the virtual address spaces belong to one controller. In this way, the primary controller may establish a correspondence between a virtual address space in each LU and a controller that can obtain data corresponding to the virtual address space. After the correspondence between a virtual address space in each LU and a corresponding controller is established, the established correspondence may be sent to the host based on a request message of the host, or the established correspondence is sent to a storage management device, so that the storage management device sends the established correspondence to the host. In this way, the host may establish, based on a controller corresponding to each virtual address space included in each LU, a correspondence between each virtual address space included in each LU and an access path that points to a controller corresponding to each virtual address space. Then, the host stores the correspondence in the host. When the host needs to deliver an IO request, the host may obtain an access path of the IO request only by querying the correspondence.

Optionally, in the first embodiment, the processing unit 410 is configured to: generate an input/output IO request, where the IO request carries a logical unit number LUN and a virtual address of to-be-accessed data; find, based on the LUN, an LU to be accessed by using the IO request; determine, based on the virtual address, a virtual address space into which the virtual address falls; and determine, based on the determined virtual address space, an access path corresponding to the virtual address space.

Optionally, in the first embodiment, the sending unit 420 is configured to deliver, along the access path, the IO request to a controller to which the access path points, so that the controller accesses, based on the LUN and the virtual address in the IO request, a disk belonging to the controller, to obtain the data requested by using the IO request.

Optionally, in a second embodiment, the host also needs to establish a correspondence between a virtual address space in each LU and a controller accessing data in the virtual address space. A correspondence establishment process is the same as that in the first embodiment, and details are not described herein again. A main difference between the second embodiment and the first embodiment is as follows: In the first embodiment, after obtaining a correspondence between a virtual address space in each LU and a controller accessing data in the virtual address space, the host further determines an access path corresponding to the virtual address space in each LU; and after receiving an IO request, obtains an access path of the IO request based on the access path corresponding to the virtual address space in each LU. However, in the second embodiment, after obtaining a correspondence between a virtual address space in each LU and a controller accessing data in the virtual address space, the host does not perform further processing; after receiving an IO request, the host determines, based on the correspondence between a virtual address space in each LU and a controller accessing data in the virtual address space, an LU and a virtual address of to-be-accessed data that are included in the IO request, to determine a corresponding controller; and determines an access path pointing to the controller as an access path of the IO request, to deliver the IO request to the controller along the access path pointing to the controller.

Optionally, in the second embodiment, the processing unit 410 is configured to: generate an input/output IO request, where the IO request carries a logical unit number LUN and a virtual address of to-be-accessed data; find, based on the LUN, an LU to be accessed by using the IO request; determine, based on the virtual address, a virtual address space into which the virtual address falls; determine, based on the determined virtual address space, a controller corresponding to the virtual address space; and determine an access path pointing to the controller as an access path of the IO request.

Optionally, in the second embodiment, the sending unit 420 is configured to deliver, along the access path, the IO request to the controller to which the access path points, so that the controller accesses, based on the LUN and the virtual address in the IO request, a disk belonging to the controller, to obtain the data requested by using the IO request.

In summary, in both the first embodiment and the second embodiment, the host establishes a correspondence between each virtual address space included in each LU and a controller corresponding to each virtual address. However, different from the second embodiment, in the first embodiment, the host further establishes, based on the correspondence between each virtual address space included in each LU and a controller corresponding to each virtual address, a correspondence between a virtual address space included in each LU and a determined access path that points to a controller corresponding to each virtual address space. Therefore, when an IO request is delivered, a difference between the first embodiment and the second embodiment is as follows: Because in the first embodiment, the host stores a correspondence between each virtual address space and an access path that points to a controller corresponding to each virtual address space, the host may directly determine, based on the correspondence, an access path corresponding to a virtual address space. However, in the second embodiment, the host stores a controller corresponding to each virtual address space included in each LU, namely, a correspondence between each virtual address space and a controller corresponding to each virtual address space. Therefore, after determining a corresponding controller based on the correspondence, the host further needs to determine one of access paths pointing to the controller as a delivery path of the IO request.

It should be understood that in both the first embodiment and the second embodiment, both the action that the host establishes the correspondence between a virtual address space included in each LU and a determined access path that points to a controller corresponding to each virtual address space and the action that the host establishes correspondence between the controller and each virtual address space included in each LU may be performed by the processing unit 410.

The host 400 may be corresponding to the host in the disk access method 200 or the disk access method 300 according to the embodiments of this application. The host 400 may include a unit configured to perform the method performed by the host in the method 200 in FIG. 2 or the method 300 in FIG. 3. In addition, units in the host 400 and other operations and/or functions are respectively intended to implement corresponding procedures of the method 200 in FIG. 2 or the method 300 in FIG. 3. For brevity, details are not described herein.

Figure 5:
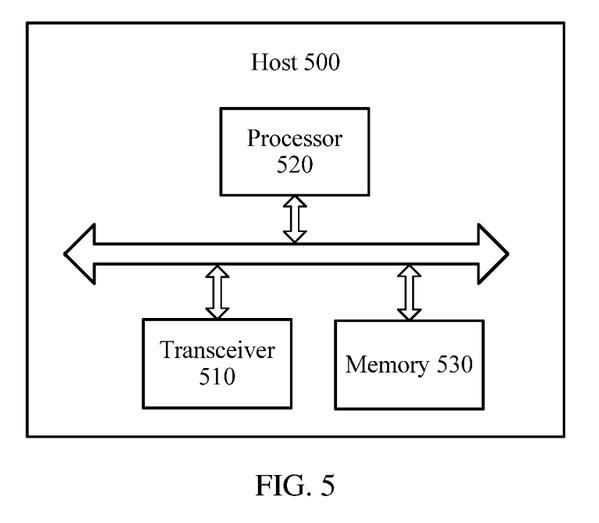
FIG. 5 is a schematic block diagram of a host according to another embodiment of this application.

FIG. 5 is a schematic block diagram of a host 500 according to another embodiment of this application. As shown in FIG. 5, the host 500 includes a transceiver 510, a processor 520, and a memory 530. The transceiver 510, the processor 520, and the memory 530 communicate with each other by using an internal connection path. The memory 530 is configured to store an instruction. The processor 520 is configured to execute the instruction stored in the memory 530, to control the transceiver 510 to receive or send a signal. The memory 530 may be disposed in the processor 520, or may be independent of the processor 520.

Specifically, the host 500 may be corresponding to the host in the disk access method 200 or the disk access method 300 in FIG. 3 according to the embodiments of this application. The host 500 may include an entity unit configured to perform the method performed by the host in the method 200 in FIG. 2 or the method 300 in FIG. 3. In addition, entity units in the host 500 and other operations and/or functions are respectively intended to implement corresponding procedures of the method 200 in FIG. 2 or the method 300 in FIG. 3. For brevity, details are not described herein.

It should be understood that the processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a central processing unit (CPU), or the processor may be another general purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of this application. The general purpose processor may be a microprocessor, or the processor may be any conventional processor or the like. The steps in the method disclosed with reference to the embodiments of this application may be directly performed by a hardware decoding processor, or may be performed by using a combination of hardware in the decoding processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. For example (but not for limitation), many forms of RAMs are available, for example, a static random access memory (SRAM, a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type.

In an implementation process, steps in the foregoing methods can be implemented by using a hardware integrated logical circuit in the processor, or by using instructions in a form of software. The steps in the disk access method disclosed with reference to the embodiments of this application may be directly performed by a hardware processor, or may be performed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

An embodiment of this application further provides a computer readable storage medium. The computer readable storage medium stores one or more programs, and the one or more programs include an instruction. When being executed by a portable electronic device that includes a plurality of application programs, the instruction can enable the portable electronic device to perform the method in the embodiment shown in FIG. 2 or FIG. 3.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A disk access method, performed by a first server, the first server connected to a storage system comprising a storage device, a logical unit (LU) mounted to the first server, the LU comprising at least two virtual address spaces, and the method comprising:
   obtaining each controller in the storage system corresponding to each virtual address space in the LU, a disk that stores data corresponding to each virtual address space belonging to each controller corresponding to each virtual address space;
   determining each access path that points to each controller corresponding to each virtual address space;
   establishing and storing a correspondence between each virtual address space and each access path that points to each controller corresponding to each virtual address space, the at least two virtual address spaces in the LU having correspondences with determined access paths different from each other, and the at least two virtual address spaces in the LU all being accessible by the first server;
   generating an input/output (IO) request for accessing the LU, the IO request carrying a virtual address of to-be-accessed data stored in the LU;
   determining, based on the virtual address, a first virtual address space into which the virtual address falls;
   determining, based on the first virtual address space, a first access path of the access paths corresponding to the first virtual address space; and
   delivering, along the first access path, the IO request to a first controller of the storage device to which the first access path points.

2. The method according to claim 1, wherein the obtaining each controller corresponding to each virtual address space in the LU comprises:
   sending a request message to a primary controller, the request message being used to request each controller corresponding to each virtual address space in the LU, and the primary controller being configured to designate each controller corresponding to each virtual address space; and
   receiving, each controller identifier of each controller corresponding to each virtual address space in the LU, sent by the primary controller.

3. The method according to claim 1, wherein the obtaining each controller corresponding to each virtual address space in the LU comprises:
   receiving each controller identifier of each controller corresponding to each virtual address space in the LU, sent by a storage management device connecting the storage device and the first server.

4. The method according to claim 1, further comprising storing the correspondence in a table stored in the first server.

5. The method according to claim 1, further comprising storing the correspondence in a tree stored in the first server.

6. A first server, connected to a storage system comprising a storage device, wherein a logical unit (LU) is mounted to the first server, wherein the LU comprises at least two virtual address spaces, and wherein the first server comprises:
   a non-transitory memory storing instructions; and
   a processor coupled to the non-transitory memory and configured to execute the instructions to:
   generate an input/output (IO) request for accessing the LU, the IO request carrying a virtual address of to-be-accessed data stored in the LU;
   determine, based on the virtual address, a first virtual address space into which the virtual address falls;
   determine, based on the first virtual address space, a first controller of the storage device corresponding to the first virtual address space;
   determine at least one access path pointing to the first controller in the storage system, wherein the first controller is capable of accessing data corresponding to the first virtual address space, wherein the at least two virtual address spaces in the LU have correspondences with determined access paths different from each other, and wherein the at least two virtual address spaces in the LU are all accessible by the first server; and deliver, along the access path of the IO request, the IO request to the first controller.

7. The first server according to claim 6, further comprising the processor configured to:

obtain each controller corresponding to each virtual address space in the LU, wherein a disk that stores data corresponding to each virtual address space belongs to each controller corresponding to each virtual address space.

8. The first server according to claim 7, wherein the processor configured to execute the instructions to obtain each controller corresponding to each virtual address space in the LU comprises the processor configured to:

send a request message to a primary controller, wherein the request message is used to request each controller corresponding to each virtual address space in the LU, and wherein the primary controller is configured to designate each controller corresponding to each virtual address space; and receive each controller identifier of each controller corresponding to each virtual address space in the LU, sent by the primary controller.

9. The first server according to claim 7, wherein the processor configured to execute the instructions to obtain each controller corresponding to each virtual address space in the LU comprises the processor configured to:

receive each controller identifier of each controller corresponding to each virtual address space in the LU, sent by a storage management device connecting the storage device and the first server.

10. A first server, connected to a storage system comprising a storage device, wherein a logical unit (LU) is mounted to the first server, wherein the LU comprises at least two virtual address spaces, and wherein the first server comprises:

a non-transitory memory storing instructions; and a processor coupled to the non-transitory memory and configured to execute the instructions to:

obtain each controller in the storage system corresponding to each virtual address space in the LU, wherein a disk that stores data corresponding to each virtual address space belongs to each controller corresponding to each virtual address space;

determine each access path that points to each controller corresponding to each virtual address space;

establish and store a correspondence between each virtual address space and each access path that points to each controller corresponding to each virtual address space, wherein the at least two virtual address spaces in the LU have correspondences with determined access paths different from each other, and wherein the at least two virtual address spaces in the LU are all accessible by the first server;

generate an input/output (IO) request for accessing the LU, wherein the IO request carries a virtual address of to-be-accessed data stored in the LU;

determine, based on the virtual address, a first virtual address space into which the virtual address falls;

determine, based on the first virtual address space, a first access path of the access paths corresponding to the first virtual address space; and deliver, along the first access path, the IO request to a first controller of the storage device to which the first access path points.

11. The first server according to claim 10, wherein the processor configured to execute the instructions to obtain each controller corresponding to each virtual address space in the LU further comprises the processor configured to execute the instructions to:

send a request message to a primary controller, wherein the request message is used to request each controller corresponding to each virtual address space in the LU, and the primary controller is configured to designate each controller corresponding to each virtual address space; and receive each controller identifier of each controller corresponding to each virtual address space in the LU, sent by the primary controller.

12. The first server according to claim 10, wherein the processor configured to execute the instructions to obtain each controller corresponding to each virtual address space in the LU further comprises the processor configured to execute the instructions to:

receive each controller identifier of each controller corresponding to each virtual address space in the LU, sent by a storage management device connecting the storage device and the first server.

13. The first server according to claim 10, wherein the processor is configured to execute the instructions to store the correspondence in a table stored in the first server.

14. The first server according to claim 10, wherein the processor is configured to execute the instructions to store the correspondence in a tree stored in the first server.

* * * * *